US012398589B2

(12) United States Patent
Carlin et al.

(10) Patent No.: US 12,398,589 B2
(45) Date of Patent: Aug. 26, 2025

(54) MAIN TILTING DOOR FOR CLOSING AN ACCESS OPENING OF A ROOM

(71) Applicant: SILVELOX GROUP S.p.A., Castelnuovo (IT)

(72) Inventors: Stefano Carlin, Castelnuovo (IT); Silvano Lamberti, Castelnuovo (IT); Diego Lamberti, Castelnuovo (IT)

(73) Assignee: SILVELOX GROUP S.p.A., Castelnuovo (IT)

( * ) Notice: Subject to any disclaimer, the term of this patent is extended or adjusted under 35 U.S.C. 154(b) by 920 days.

(21) Appl. No.: 17/424,597

(22) PCT Filed: Jan. 17, 2020

(86) PCT No.: PCT/IB2020/050375

§ 371 (c)(1),
(2) Date: Jul. 21, 2021

(87) PCT Pub. No.: WO2020/152554

PCT Pub. Date: Jul. 30, 2020

(65) Prior Publication Data

US 2022/0106828 A1 Apr. 7, 2022

(30) Foreign Application Priority Data

Jan. 21, 2019 (IT) ........................ 102019000000893

(51) Int. Cl.
*E06B 3/50* (2006.01)
*E05D 13/00* (2006.01)
(Continued)

(52) U.S. Cl.
CPC .......... *E06B 3/5018* (2013.01); *E05D 13/145* (2013.01); *E05D 15/165* (2013.01);
(Continued)

(58) Field of Classification Search
CPC ........... E06B 2003/7044; E06B 3/7003; E06B 1/522; E06B 1/526; E06B 2003/7011; E06B 3/5018; E05D 13/145
(Continued)

(56) References Cited

U.S. PATENT DOCUMENTS 2,150,321 A * 3/1939 Ferris .................... E05D 15/445
49/205
3,038,568 A * 6/1962 Morgan .................... E04B 2/90
52/235
(Continued)

FOREIGN PATENT DOCUMENTS

| | | | |
|---|---|---|---|
| EP | 0 264 876 | * | 4/1988 |
| FR | 2978788 | A1 | 2/2013 |
| GB | 1 045 351 | * | 10/1966 |

*Primary Examiner* — Gregory J Strimbu
(74) *Attorney, Agent, or Firm* — ASLAN LAW, P.C.

(57) ABSTRACT

A main tilting door for the closure of an access opening of a room includes two fixed uprights, including vertical sliding guides, and one fixed crosspiece associable with each other to define a fixed frame. The door includes two movable uprights and two movable crosspieces associable with each other to define a movable frame. The door includes tilting movement device/unit/component/apparatus or the like including two lateral supporting arms each having a first end which can be hinged to an intermediate area of the movable uprights and a second end which can be hinged to a top of the fixed uprights; and two sliding supports movable along the vertical sliding guides. The door includes panels associable with the movable frame. At least one of the movable uprights and the movable crosspieces includes a sliding track and cursors movable along the sliding track, the panels associable with the cursors.

12 Claims, 8 Drawing Sheets

(51) Int. Cl.

| | |
|---|---|
| ***E05D 15/16*** | (2006.01) |
| ***E05D 15/40*** | (2006.01) |
| ***E05F 15/686*** | (2015.01) |
| ***E06B 3/06*** | (2006.01) |
| ***E06B 3/70*** | (2006.01) |
| ***E06B 3/964*** | (2006.01) |

(52) U.S. Cl.
CPC .......... *E05D 15/401* (2013.01); *E05F 15/686* (2015.01); *E06B 3/06* (2013.01); *E06B 3/7003* (2013.01); *E06B 3/9644* (2013.01); *E05Y 2201/434* (2013.01); *E05Y 2201/50* (2013.01); *E05Y 2201/624* (2013.01); *E05Y 2201/64* (2013.01); *E05Y 2201/654* (2013.01); *E05Y 2201/684* (2013.01); *E05Y 2900/106* (2013.01); *E06B 2003/7044* (2013.01); *E06B 2003/7086* (2013.01)

(58) Field of Classification Search
USPC ............................................................ 52/775
See application file for complete search history.

(56) References Cited

U.S. PATENT DOCUMENTS

| | | | | | |
|---|---|---|---|---|---|
| 3,407,553 | A * | 10/1968 | Halpern | B66B 13/306 49/505 |
| 3,695,332 | A * | 10/1972 | Bahnsen | E05F 15/686 292/225 |
| 4,653,565 | A * | 3/1987 | Iha | E05F 15/686 160/193 |
| 4,819,376 | A | 4/1989 | Taddei | |
| 5,038,538 | A * | 8/1991 | Rozon | E06B 1/526 52/509 |
| 5,365,993 | A * | 11/1994 | Jella | E05F 15/673 160/232 |
| 5,373,663 | A * | 12/1994 | Turini | E05F 15/681 49/200 |
| 5,444,958 | A * | 8/1995 | Lu | E06B 3/5454 52/771 |
| 5,488,982 | A * | 2/1996 | Rejc | E06B 9/15 160/310 |
| 5,682,719 | A * | 11/1997 | Huang | A47G 5/00 52/775 |
| 2007/0068097 | A1 | 3/2007 | MIErAU | |
| 2010/0077664 | A1* | 4/2010 | Stensland | E06B 3/721 160/181 |
| 2015/0376933 | A1* | 12/2015 | Schweiss | E05F 15/622 52/698 |
| 2016/0032640 | A1* | 2/2016 | Wang Chen | E06B 3/5892 49/502 |

* cited by examiner

MAIN TILTING DOOR FOR CLOSING AN ACCESS OPENING OF A ROOM

CROSS-REFERENCE TO RELATED APPLICATIONS

This application claims priority to IT patent application No. 102019000000893 filed on Jan. 21, 2019, and this application claims priority to and is a 371 of international PCT Application No. PCT/IB2020/050375 filed on Jan. 17, 2020, the entire contents of which are hereby incorporated by reference.

TECHNICAL FIELD

The present invention relates to a main tilting door for the closure of an access opening of a room, particularly of a garage space.

BACKGROUND ART

Main tilting doors are closure systems in which an overhead door is moved with respect to a fixed frame by means of a system of articulation arms, hinges and counterweights.

The overhead door has height and width equal to the entire access opening to be closed.

In the closure position, in fact, the overhead door is arranged vertically and occupies the access opening area of the garage space, closing it.

During opening, on the other hand, the overhead door tends to be placed horizontally, at the top of the fixed frame, freeing the passage through the access opening.

Main tilting doors of known type do have several drawbacks, including the fact that they consist of a plurality of components that are difficult to assemble and mount.

Therefore, the construction of traditional main tilting doors is carried out in the factory, using special equipment in assembly lines, with the consequence that the main tilting door thus assembled has very big size and weight and can only be transported to the construction site with considerable difficulty.

The installation on site of this type of main tilting doors is also difficult to carry out, as it requires the use of special lifting equipment (cranes) and qualified personnel for installation, with a consequent increase in costs.

As a result, the supply and assembly are carried out exclusively by specialized companies, thus limiting the spread of such main tilting doors and making them unattractive for customers.

Description of the Invention

The main aim of the present invention is to devise a main tilting door for the closure of an access opening of a room, particularly of a garage space, which allows simple and practical assembly.

A further object of the present invention is to obtain a main tilting door the components of which are of reduced size and weight, so that they can be easily moved and transported.

Another object of the present invention is to enable assembly on site that is free of the need for bulky and expensive transport and lifting equipment and highly skilled labor.

Another object of the present invention is to devise a main tilting door for the closure of an access opening of a room, particularly of a garage space, which allows overcoming the aforementioned drawbacks of the prior art in the ambit of a simple, rational, easy, effective to use and low cost solution.

The objects set out above are achieved by the present main tilting door for the closure of an access opening of a room, particularly of a garage space according to one or more aspects of the disclosure.

BRIEF DESCRIPTION OF THE DRAWINGS

Other characteristics and advantages of the present invention will be more evident from the description of a preferred, but not exclusive, embodiment of a main tilting door for the closure of an access opening of a room, particularly of a garage space, and of a method for the assembly on site of a main tilting door, illustrated as an indication, but not limited to, in the attached tables of drawings in which.

Figure 3:
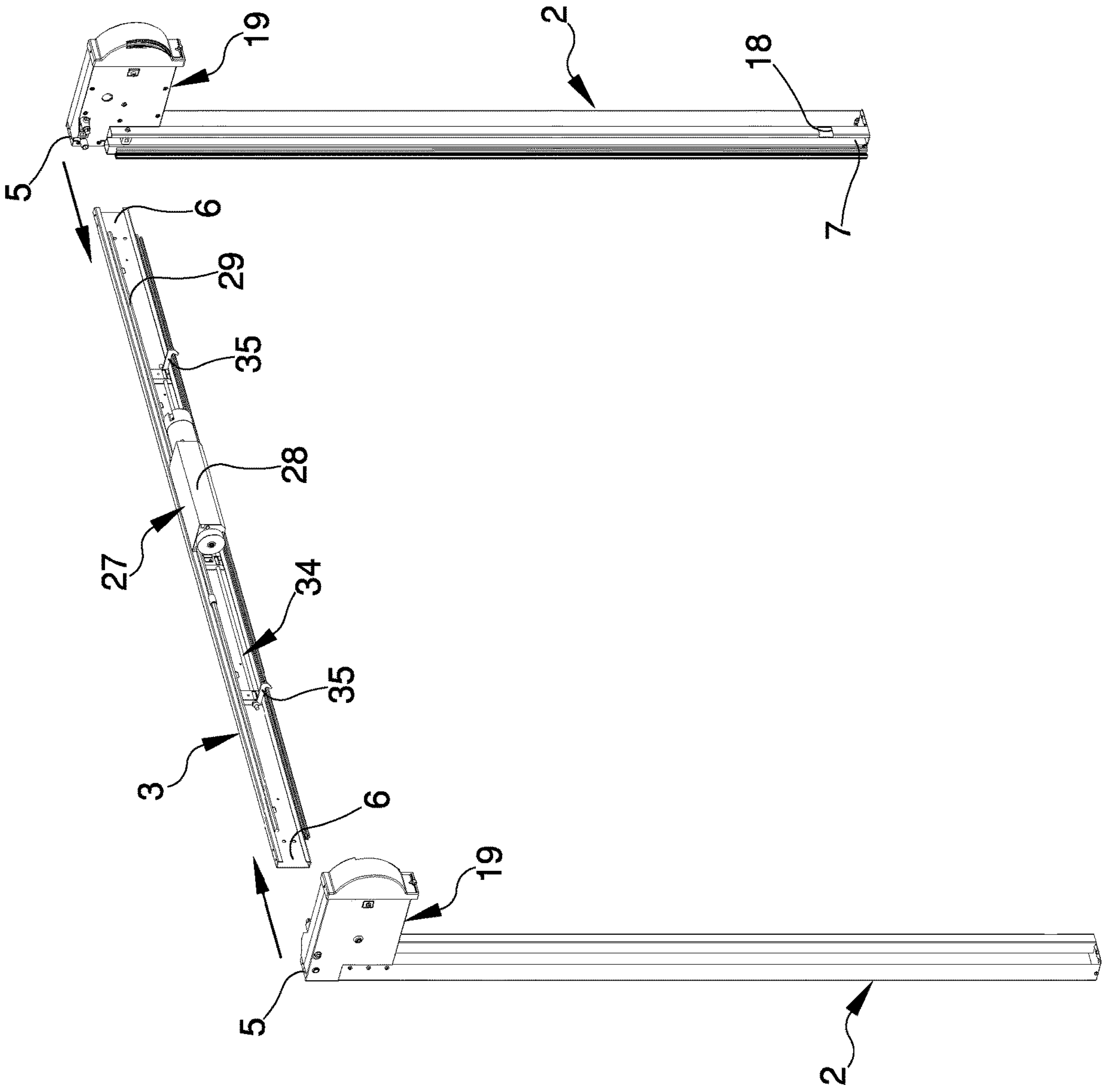
Figure 4:
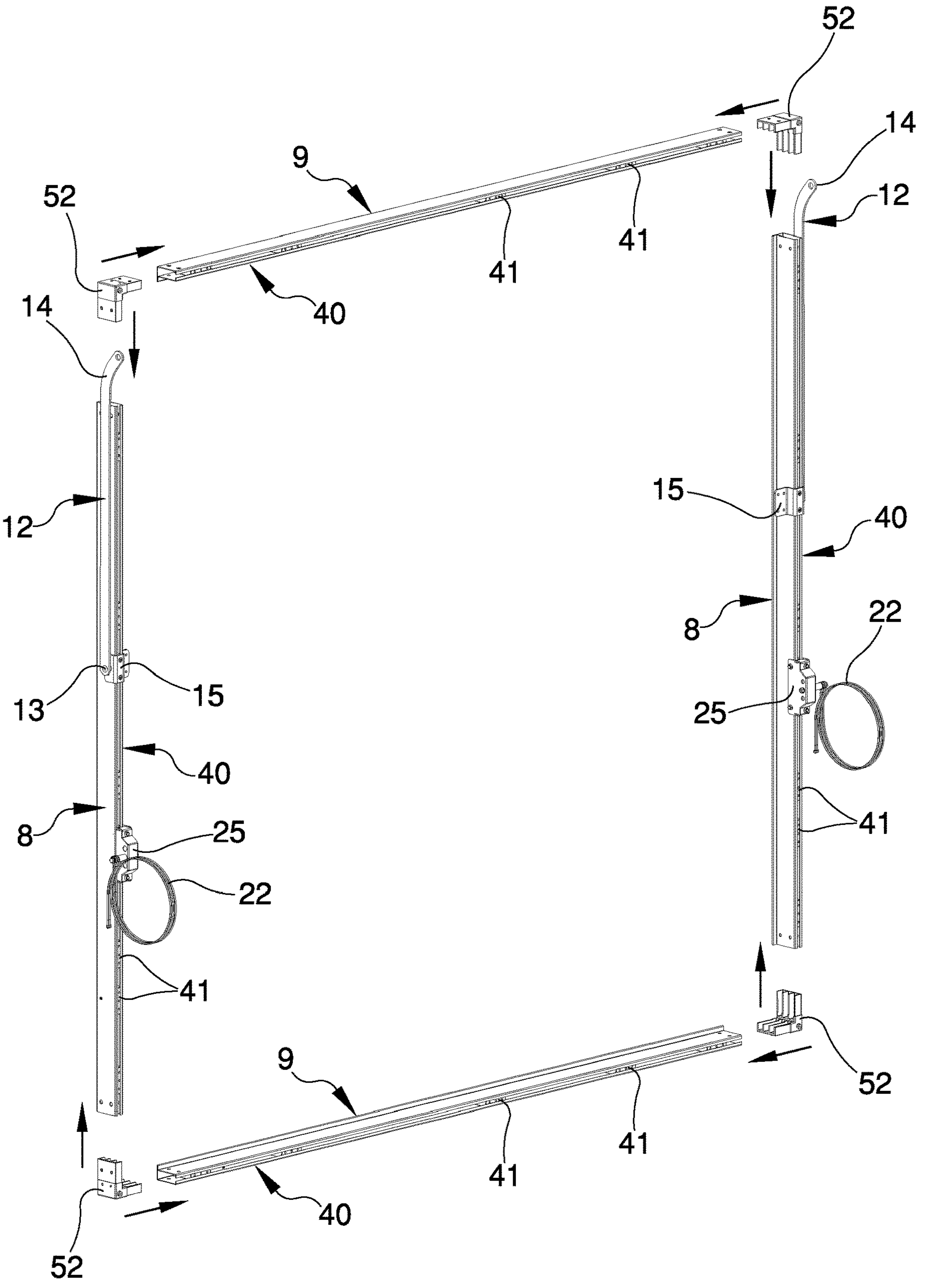
Figure 5:
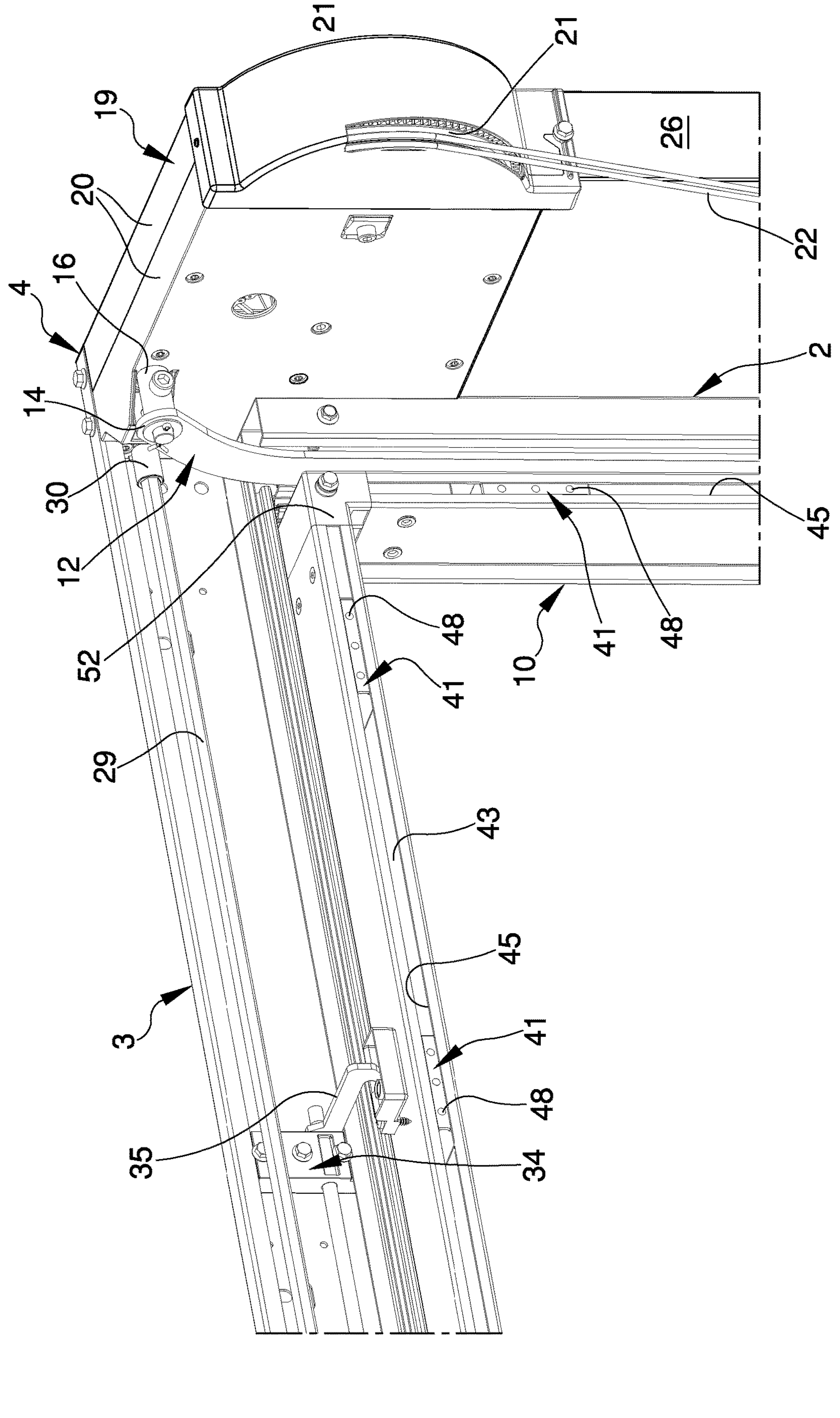
Figure 6:
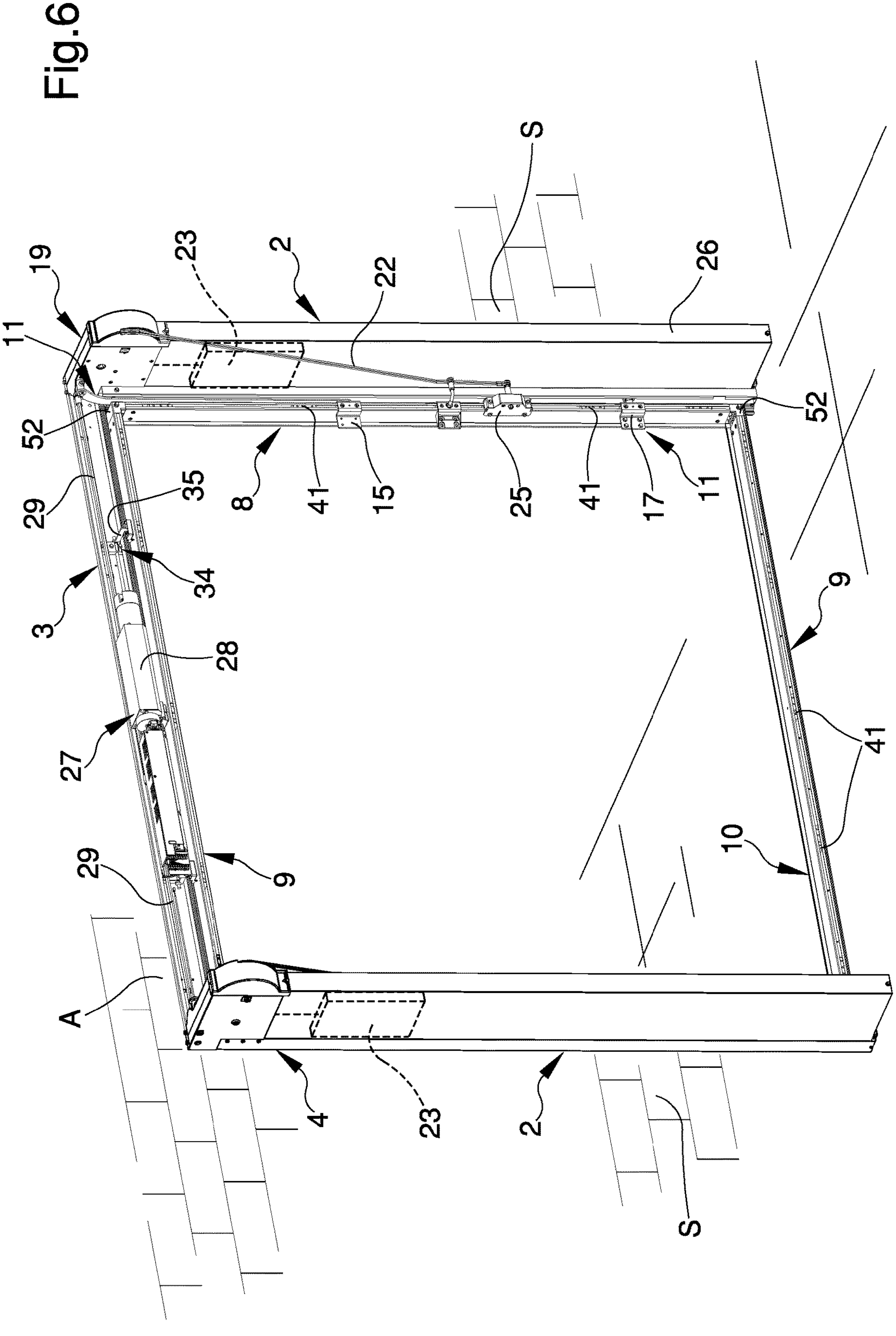
Figure 7:
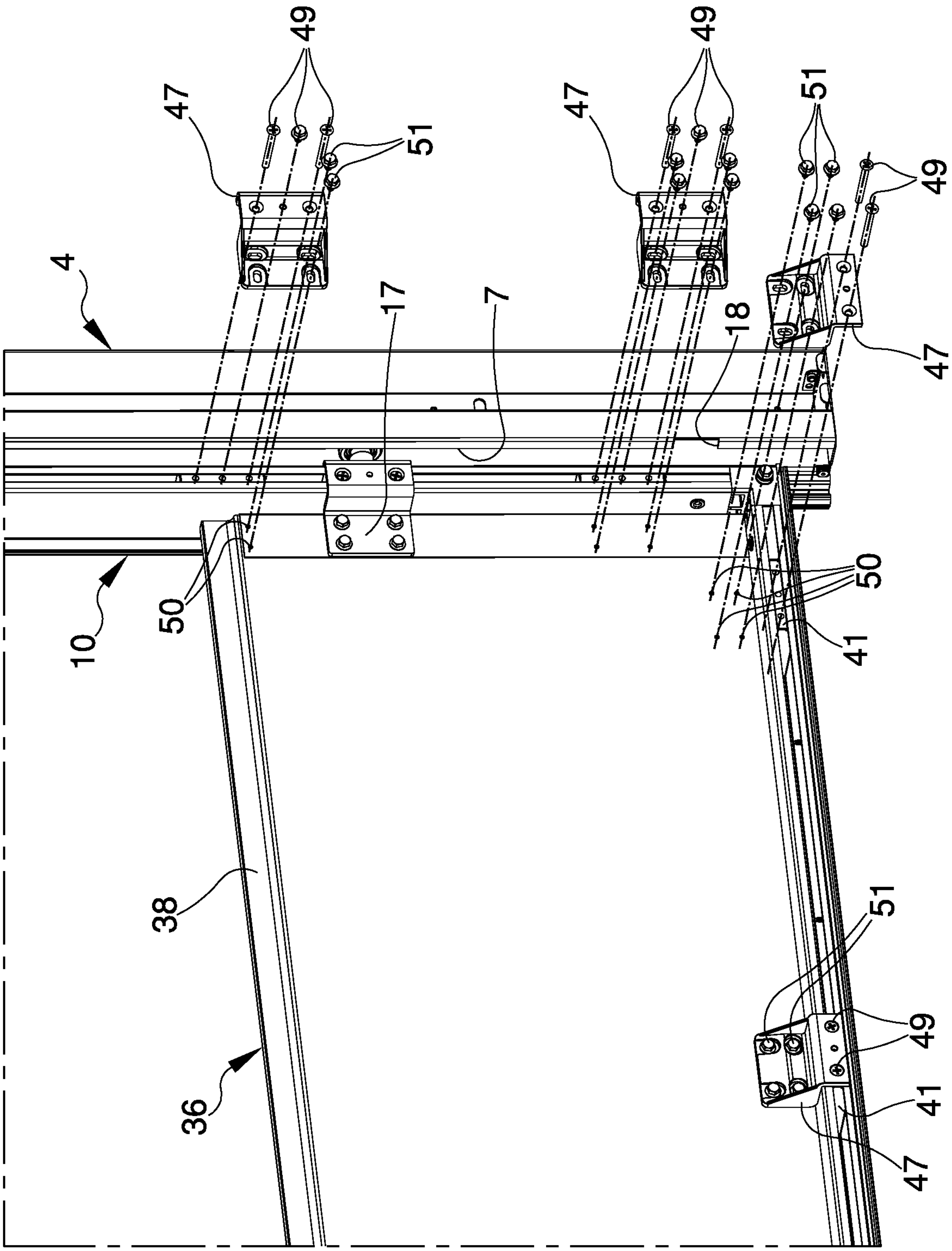

FIG. **2*a*** is an exploded view of a detail of the main tilting door according to the invention;

FIG. **2*b*** is an exploded view of another detail of the main tilting door according to the invention;

FIG. 3 is an axonometric view of the assembly phase of the fixed frame provided by the method according to the invention;

FIG. 4 is an axonometric view of the assembly phase of the movable frame provided by the method according to the invention;

FIG. 5 is an axonometric view of the hinging phase of the lateral supporting arms to the fixed uprights provided by the method according to the invention;

FIG. 6 is an axonometric view of the association phase of the sliding supports with the movable uprights provided by the method according to the invention;

FIG. 7 is an axonometric view of the association phase of the panels with the movable frame provided by the method according to the invention.

EMBODIMENTS OF THE INVENTION

With particular reference to these figures, reference numeral 1 globally indicates a main tilting door for the closure of an access opening of a room, particularly of a garage space.

The main tilting door 1 comprises at least two fixed uprights 2 and a fixed crosspiece 3 associable with each other to define a fixed frame 4 which can be fixed to an access opening of a room.

For this purpose, the fixed uprights 2 comprise at least one coupling portion 5 which can be coupled by interlocking to a respective coupling seat 6 arranged on the fixed crosspiece 3.

In particular, the coupling portion 5 consists e.g. of a first shaping that is obtained at the top of the fixed uprights 2 and that can be prismatically coupled to a second shape.

The second shape is obtained at the opposite ends of the fixed crosspiece 3 and defines the coupling seats 6.

After the coupling portions 5 have been coupled by interlocking to the coupling seats 6, the fixed uprights 2 and the fixed crosspiece 3 can be locked in place by means of screws and/or bolts.

This ensures that the fixed uprights 2 and the fixed crosspiece 3 are assembled correctly and extremely easily and quickly, even during the installation of the main tilting door 1.

The fixed uprights 2 are provided with vertical sliding guides 7.

The main tilting door 1 also comprises at least two movable uprights 8 and two movable crosspieces 9 associable with each other to define a movable frame 10 that is substantially rectangular and movable with respect to the fixed frame 4. The assembly method of the movable uprights 8 and of the movable crosspieces 9 to obtain the movable frame 10 will be described in detail later on in this treatise.

In order to allow the opening and closing motion of the main tilting door 1, tilting movement means 11 are provided, which are adapted to guide the movement of the movable frame 10 with respect to the fixed frame 4.

In particular, thanks to the tilting movement means 11 the movable frame 10 is movable between a closed position, in which it is arranged vertically, and an open position, in which it is arranged at the top of the fixed uprights 2 parallel to the road surface.

The tilting movement means 11 comprise at least two lateral supporting arms 12, each having a first end 13 which can be hinged to an intermediate area of the movable uprights 8 and a second end 14 which can be hinged to the top of the fixed uprights 2.

More in detail, the first end 13 of each lateral supporting arm 12 is hinged to a small block 15 attached to a respective movable upright 8.

The second end 14 of each lateral supporting arm 12, on the other hand, is coupled to a hinge pin 16 placed at the top of a respective fixed upright 2. The lateral supporting arms 12 have the function of guiding the movement of the movable frame 10 and of supporting the weight thereof.

The tilting movement means 11 comprise at least two sliding supports 17 which can be associated with the movable uprights 8 and movable along the vertical sliding guides 7 defined on the fixed uprights 2. The sliding supports 17 consist, e.g., of rollers that roll inside the vertical sliding guides 7.

In order to couple the sliding supports 17 to the vertical sliding guides 7, each of them comprises at least one discharge portion 18, i.e. an interruption of the vertical sliding guides 7 adapted to allow the insertion of said sliding supports 17 inside these.

Each of the sliding supports 17 is attached to a respective movable upright 8 at a point comprised between the base of the movable upright 8 and the aforementioned intermediate hinging area of the lateral supporting arms 12.

To facilitate the movement of the movable frame 10 between the closed position and the open position, the top of each fixed upright 2 comprises at least one pulley assembly 19.

Each pulley assembly 19 is provided with:

- at least one pair of half-shells 20, made of plastic material; and
- at least one pulley 21, pivotally associated with the pair of half-shells 20 and on which a rope 22, connected to a respective movable upright 8 and to at least one counterweight 23 can be at least partially wound.

The pair of half-shells 20, in actual facts, defines a container inside which the pulley 21 is housed.

The half-shells 20 have reinforcement ribs 24 which give them high strength. The half-shells 20 assembled together, in fact, have a load-bearing function and not only do they support the pulleys 21 arranged inside them, but they also support the hinge pin 16, to which the lateral supporting arms 12 are hinged, and join the fixed uprights 2 to the fixed crosspiece 3; in this regard, it should be noted that the coupling portions 5 are obtained on the half-shells 20.

In the context of the present invention, moreover, the term "rope" is to be understood as any flexible element which, wound on the pulleys 21, can perform the function of a proper rope, hence also a belt, chain or the like.

The rope 22 has one end associated with a rope support 25, which is fixed permanently to a respective movable upright 8, and an opposite end associated with a respective counterweight 23.

The counterweights 23 are arranged below the pulleys 21 and are movable vertically along the fixed uprights 2.

Conveniently, the fixed uprights 2 are associated with the protective casing 26 inside which the counterweights 23 move.

The function of the counterweight 23 is to facilitate the movement of the movable frame 10 when opening and closing the main tilting door 1.

The setting of the pulleys 21 in rotation and the movement of the relevant counterweights 23 is preferably obtained by the fact that the main tilting door 1 is provided with at least one electric motor unit 27 to allow for the automated opening and closing.

The electric motor unit 27 is assembled on the fixed crosspiece 3, e.g. inside a protective casing not shown in the figures; in practice, thanks to the protective casing, the electric motor unit 27 is incorporated inside the fixed crosspiece 3 and is not visible outside the main tilting door 1 from the inside of the space.

The electric motor unit 27 comprises a motor 28 adapted to set a drive shaft 29 in rotation.

The drive shaft 29 extends along the substantial entirety of the fixed crosspiece 3 up to the tops of the fixed uprights 2.

The ends of the drive shaft 29 can be associated by interlocking with the respective pivoting pins 30 mounted on the half-shells 20.

Figure 1:
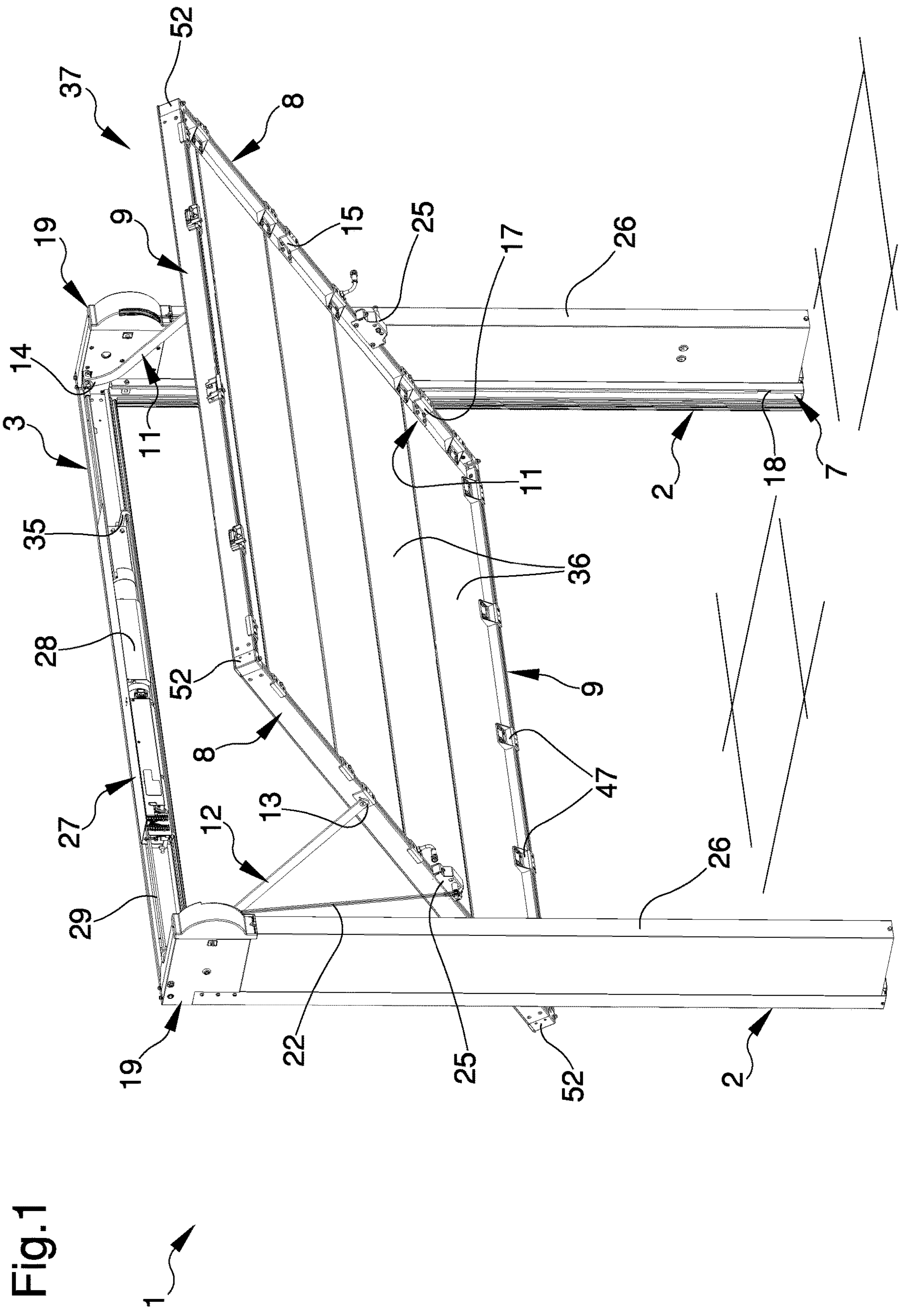
FIG. 1 is an axonometric view of the main tilting door according to the invention.
Figure 2:
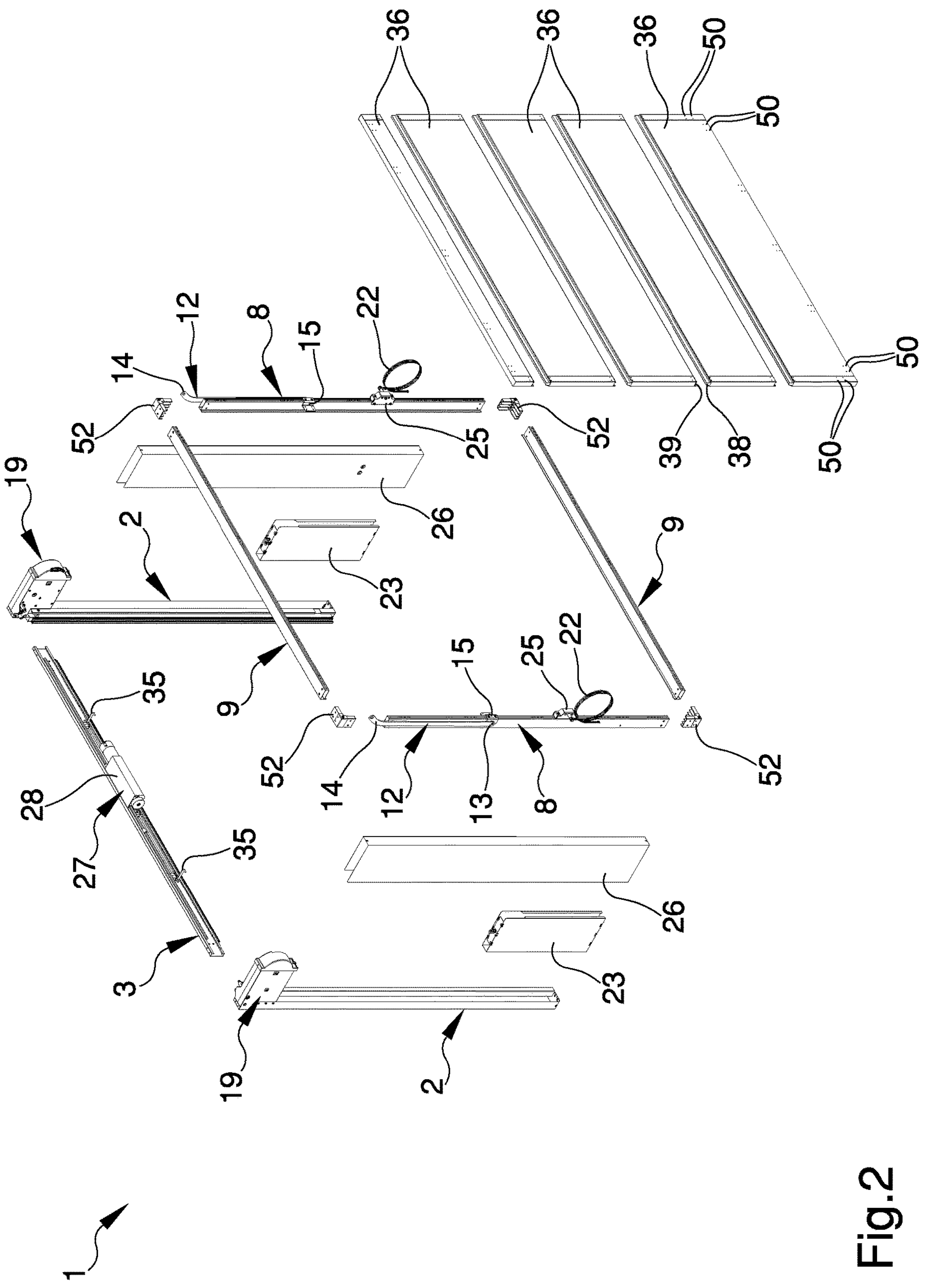
FIG. 2 is an exploded view of the main tilting door according to the invention.
Figure 2A:
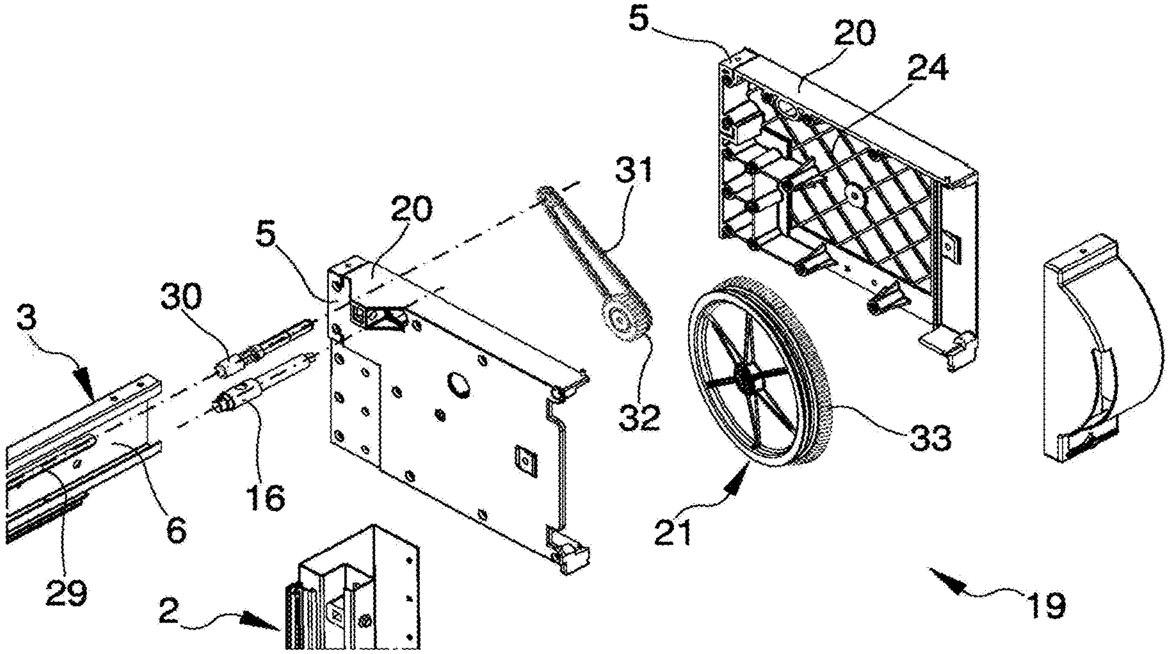
Figure 2B:
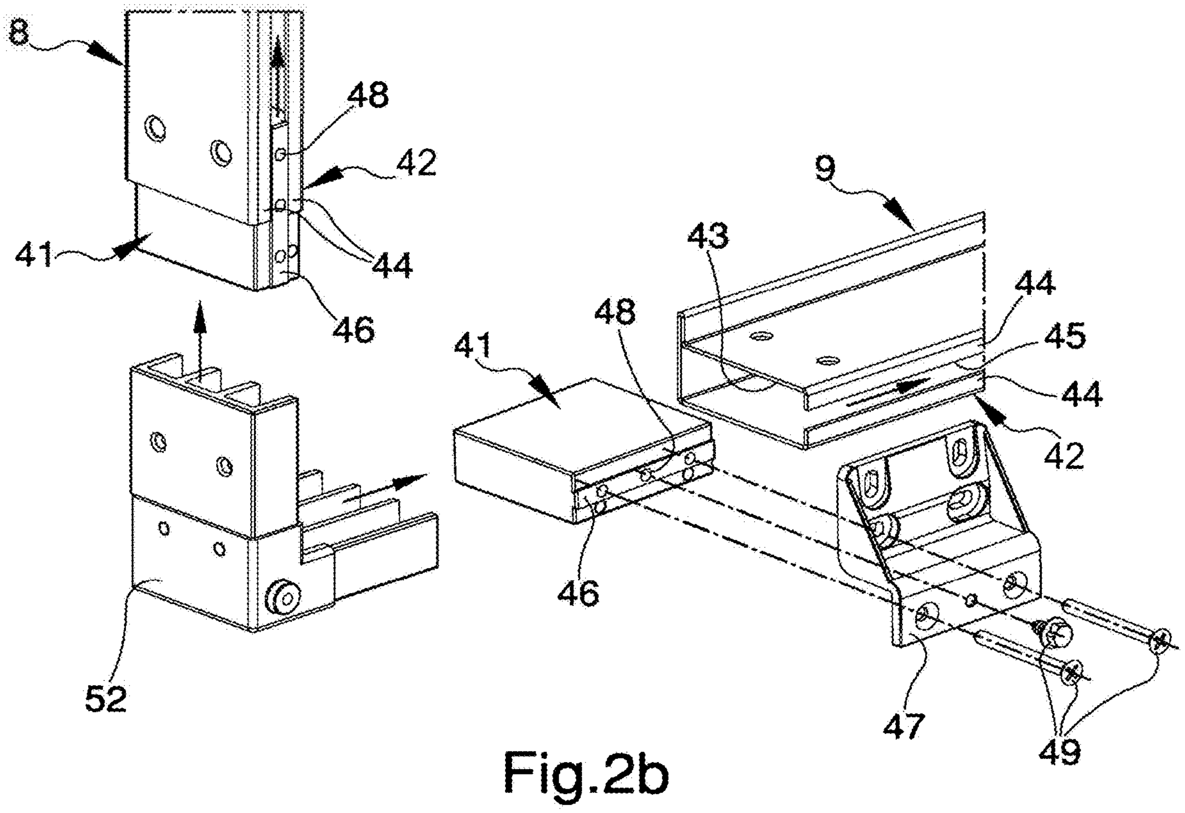

When the pivoting pins 30 are coupled by interlocking to the drive shaft 29, they transmit motion to the pulleys 21 by means of a chain mechanism 31 which sets in rotation a geared pinion 32 meshing with a gearing 33 obtained on each pulley 21 (FIG. 2*a*).

In turn, the pulleys 21, by rotating, move the counterweight 23 and allow the opening and closing of the main tilting door 1.

In the closed position, the movable frame 10 is lockable to the fixed crosspiece 3 by means of a locking device 34 which prevents it from opening.

In more detail, the locking device 34 comprises at least one clamping element 35, preferably two, associated movable in rotation with the fixed crosspiece 3 and protruding therefrom to intercept the movable frame 10.

To allow the main tilting door 1 to open, the clamping element 35 is rotated, thus freeing the movable frame 10 and allowing it to be moved.

The locking device 34 is conveniently associated with the electric motor unit 27 so that the locking/release of the movable frame 10 in the closed position can also be automated.

The main tilting door 1 also comprises a plurality of panels 36 associable with the movable frame 10 to form an overhead door 37.

In particular, each of the aforementioned panels 36 has a substantially rectangular shape, and has two long sides opposed to each other and two short sides opposed to each other.

In addition, the panels 36 comprise at least one of either a connecting portion 38 or a receiving portion 39, complementary to each other, adapted to allow the association of each panel 36 with at least one adjacent panel 36.

In more detail, the connecting portion 38 and the receiving portion 39 are defined on at least one of the long sides of the panels 36.

The panels 36 can be fixed to the movable frame 10 as follows.

At least one of either the movable uprights 8 or the movable crosspieces 9 comprises at least one sliding track 40 and a plurality of cursors 41 movable along the sliding track 40.

Advantageously, the sliding track 40 comprises at least one profiled element 42 defining a longitudinal cavity 43, adapted to house the cursors 41, and provided with two longitudinal folds 44 spaced apart from each other to define a longitudinal fissure 45.

The profiled element 42 extends along the entire length of at least one of either the movable uprights 8 or the movable crosspieces 9.

In the embodiment shown in the figures, the sliding tracks 40 are defined on both movable uprights 8 and both movable crosspieces 9.

It should also be noted that, again in the embodiment shown in the figures, the movable uprights 8 and the movable crosspieces 9 coincide with the sliding tracks 40 and with the profiled elements 42.

The cursors 41 conveniently comprise at least one protruding portion 46 defined on one side of the cursor 41, adapted to guide the sliding thereof along the longitudinal fissure 45.

The panels are associable with the cursors 41, in particular by interposition of the supporting brackets 47.

Advantageously, the cursors 41 are provided with first holes 48 adapted to allow the association of the cursors 41 with the supporting brackets 47 by means of first threaded connection elements 49 which can be screwed into the aforementioned first holes 48 and passing through the longitudinal fissure 45. In turn, the panels 36 are provided with the second holes 50 adapted to allow the association of the panels 36 with the supporting brackets 47 by means of second threaded connection elements 51 which can be screwed into the aforementioned second holes 50.

The screwing of the first threaded connection elements 49 into the first holes 48 allows the cursors 41 and the supporting brackets 47 to be tightened in a sandwich-like manner on opposite sides of the longitudinal folds 44, blocking the cursors 41 and the supporting brackets 47 along the sliding tracks 40.

Afterwards, the screwing of the second threaded connection elements 51 into the second holes 50 allows the panels 36 to be fixed to the supporting brackets 47 and then to the movable frame 10.

Preferably the first holes 48 and the second holes 50 are threaded and have a nut screw into which the first threaded connection elements 49 and the second threaded connection elements 51 can be screwed. Alternatively, the cursors 41 and the panels 36 can be provided with the respective holes 48, 50 unthreaded and, in this case, the corresponding threaded connection elements 49, 51 are of the type of self-tapping screws. The cursors 41 can be conveniently used to fix the small block 15, the rope support 25 and/or the sliding supports 17 in the desired position of the movable uprights 8 in the same way as for the supporting brackets 47.

The particular solution of providing movable cursors 41 along the sliding tracks 40 to which the panels 36 can be fixed makes it possible to place the cursors 41 along the movable uprights 8 and the movable crosspieces 9 depending on the size of the panels 36 and on their assembly position on the movable frame 10, considerably simplifying the assembly operations of the main tilting door 1 and its assembly on site.

The particular solution of providing the profiled elements 42 defining a longitudinal cavity 43 is also particularly convenient for the assembly and mounting operations of the movable frame 10.

In this regard, it should be noted that, advantageously, the main tilting door 1 is provided with at least one "L"-shaped angular junction element 52 insertable into the aforementioned longitudinal cavities 43 of one of the movable uprights 8 and of one of the adjacent movable crosspieces 9.

After the angular junction elements 52 have been coupled by interlocking to the sliding tracks 40, the movable uprights 8 and the movable crosspieces 9 are locked in position by means of screws and/or bolts.

This allows the movable uprights 8 and the movable crosspieces 9 to be joined together and allows the movable frame 10 to be assembled quickly and easily, even during assembly on site.

The cursors 41, the angular junction elements 52 and the supporting brackets 47 can be made of plastic material, which gives them a reduced weight compared to the use of metal materials, while maintaining a high resistance to mechanical stress.

The present invention also relates to a method for the assembly on site of a main tilting door 1.

This method comprises the transport phase of an assembly kit of a main tilting door 1 at the point where the access opening of the room is located, in which the assembly kit comprises:

- at least the two fixed uprights 2 and the fixed crosspiece 3, wherein the fixed uprights 2 comprise the vertical sliding guides 7;
- at least the two movable uprights 8 and the two movable crosspieces 9;
- at least the two lateral supporting arms 12;
- at least the two sliding supports 17;
- the plurality of panels 36.

In particular, during transport, the fixed uprights 2 and the fixed crosspiece 3 are disassembled from each other, and the movable uprights 8, the movable crosspieces 9 and the plurality of panels 36 are disassembled from each other.

In the aforementioned assembly kit, the lateral supporting arms 12 are pre-assembled to the movable uprights 8 and, in particular, the first end 13 of the lateral supporting arms 12 is hinged at the point where the intermediate area of the movable uprights 8 is located, while the second end 14, opposed to the first end 13, is free.

In addition, in the aforementioned assembly kit the movable uprights 8 are supplied with the rope supports 25 pre-assembled to the movable uprights 8 and the ropes 22 already associated with the rope supports 25.

Conveniently, the assembly kit also comprises:

- the sliding tracks 40 associated with the movable uprights 8 and with the movable crosspieces 9;
- the plurality of cursors 41 movable along the sliding tracks 40;
- the supporting brackets 47 interposable between the cursors 41 and the panels 36;
- the "L"-shaped angular junction elements 52 adapted to join the movable uprights 8 and the movable crosspieces 9.

According to the invention, after the assembly kit has been transported in the proximity of the access opening of the space, the fixed uprights 2 and the fixed crosspiece 3 are assembled together to obtain the fixed frame 4.

In more detail, the fixed crosspiece 3 is interposed perpendicularly with respect to the fixed uprights 2 and joined to them by interlocking through the prismatic coupling between the coupling portions 5 and the coupling seats 6.

After the coupling portions 5 have been coupled by interlocking to the coupling seats 6, the fixed uprights 2 and the fixed crosspiece 3 are locked in position using screws and/or bolts.

During the assembly of the fixed frame 4, the drive shaft 29 is coupled by interlocking to the pivoting pins 30 connected to the pulleys 21.

The fixed frame 4 is then fixed to the access opening of the space, where the fixed crosspiece 3 is fixed to the lintel A of the access opening and each of the fixed uprights 2 is fixed to a respective shoulder S of the access opening.

Afterwards, the movable uprights 8 and the movable crosspieces 9 are assembled with each other to obtain the substantially rectangular movable frame 10.

In particular, the assembly of the movable uprights 8 with the movable crosspieces 9 is carried out by partial insertion of the angular junction elements 52 into the sliding tracks 40.

After the angular junction elements 52 have been coupled by interlocking to the sliding tracks 40, the movable uprights 8 and the movable crosspieces 9 are locked in position by means of screws and/or bolts.

The "L" shape of the angular junction elements 52 makes it easy to join the movable uprights 8 to the movable crosspieces 9, perpendicularly to each other.

The movable frame 10 is then placed in a substantially vertical position and connected to the fixed frame 4.

In particular, the second end 14 of the lateral supporting arms 12 is hinged to the top of the fixed uprights 2 so that the weight of the movable frame 10 is supported by the lateral supporting arms 12.

Afterwards, the sliding supports 17 are engaged sliding in the vertical sliding guides 7 defined on the fixed uprights 2.

More in detail, the sliding supports 17 are inserted inside the discharge portions 18 defined in the aforementioned vertical sliding guides 7.

The sliding supports 17 are then moved along the vertical sliding guides 7 and fixed to a cursor 41 inside the sliding tracks 40, locking them both to the corresponding movable upright 8.

At this point, the movable frame 10 is connected to the fixed frame 4 and movable with respect thereto, with a tilting movement, and the ropes 22 are wound around the pulleys 21 and associated with the counterweights 23.

Finally, the panels 36 are associated with the movable frame 10 to define the overhead door 37 and, in particular, the assembly takes place with the movable frame 10 placed in a substantially vertical position.

More in detail, one of the aforementioned panels 36 is positioned at the base of the movable frame 10, resting on the movable crosspiece 9 positioned below, after which the cursors 41 are suitably displaced and positioned along the sliding tracks 40 so as to place them in the proximity of the second holes 50 on the panel 36.

The panel 36 is then fixed to the movable frame 10 by interposition of the supporting brackets 47 which in turn are fixed to the cursors 41 and to the panel 36 itself.

Another of the aforementioned panels 36 is then mounted by interlocking on top of the previous one, and the previous phases of displacing the cursors 41 and fixing the supporting brackets 47 are repeated to allow the fixing of the aforementioned other panel 36 to the movable frame 10.

The assembly phase of another of the panels 36 is repeated until it reaches the top of the movable frame 10.

The supporting brackets 47 mounted on the movable uprights 8 are conveniently interposed between one panel 36 and the panel 36 adjacent thereto, in order to ensure a better fixing to each other.

It has in practice been ascertained that the described invention achieves the intended objects and in particular it is underlined that the main tilting door 1 allows simple assembly, thus ensuring practical assembly on site.

In addition, the main tilting door 1 consists of components of reduced size and weight, which allow easy transport and movement.

The components of the main door to be assembled are in fact easy to move and, in addition, have different parts made of plastic, which is a considerably lighter material than the use of metal materials.

In this regard it is important to point out that the main tilting door 1 according to the invention can be assembled on site by a small number of fitters, not necessarily highly qualified personnel, and without cumbersome and expensive lifting equipment.

The invention claimed is:

1. A main tilting door for closing an access opening of a room, the main tilting door comprising:

at least two fixed uprights and one fixed crosspiece associable with each other to define a fixed frame which can be fixed to one or more structures that form at least part of the access opening of the room, wherein said fixed uprights comprise vertical sliding guides;

at least two movable uprights and two movable crosspieces associable with each other to define a substantially rectangular movable frame;

a tilting movement apparatus of said movable frame comprising:

at least two lateral supporting arms each having a respective first end which can be hinged to an intermediate area of a respective one of said movable uprights and a respective second end which can be hinged to a top of a respective one of said fixed uprights; and at least two sliding supports associable with said movable uprights and movable along said vertical sliding guides; and a plurality of panels associable with said movable frame;

wherein at least one of said movable uprights and said movable crosspieces comprises at least one sliding track and a plurality of cursors movable along said sliding track, said panels being associable with said cursors, wherein said sliding track comprises at least one profiled element defining a longitudinal cavity, adapted to house said cursors, and provided with two longitudinal folds spaced apart from each other to define a longitudinal fissure, wherein said longitudinal cavity has a rectangular shaped first cross-section with two long sides and two short sides, and each of said cursors has a rectangular shaped second cross-section with two long sides and two short sides that substantially fills the first cross-section of the longitudinal cavity of said sliding track, and wherein each of said cursors comprises at least one protruding portion defined on one of said short sides of the cursor, said protruding portions adapted to guide the sliding of the cursors along said longitudinal fissure.

2. The main tilting door according to claim 1, wherein said panels are associable with said cursors by interposition of supporting brackets.

3. The main tilting door according to claim 2, wherein said cursors are provided with first holes adapted to allow an association of said cursors with said supporting brackets via first threaded connection elements which can be screwed into said first holes and pass through said longitudinal fissure, the screwing of said first threaded connection elements into said first holes being adapted to tighten in a sandwich-like manner said cursors and said supporting brackets on opposite sides of said longitudinal folds to lock said cursors and said supporting brackets relative to said sliding track.

4. The main tilting door according to claim 3, wherein said panels are provided with second holes adapted to allow an association of said panels with said supporting brackets via second threaded connection elements which can be screwed into said second holes.

5. The main tilting door according to claim 1,
wherein said profiled element extends along the entire length of the at least one of said movable uprights and said movable crosspieces.

6. The main tilting door according to claim 1, wherein each of said panels comprises at least one of a connecting portion and a receiving portion, complementary to each other, adapted to allow an association of one of said panels with at least one adjacent panel of said plurality of panels.

7. The main tilting door according to claim 6, wherein each of said panels has a substantially rectangular shape and has two long sides opposed to each other and two short sides opposed to each other, at least one of said long sides of said one of said panels defining said connecting portion and at least one of said long sides of said at least one adjacent panel defining said receiving portion.

8. The main tilting door according to claim 1, further comprising: at least one “L”-shaped angular junction element insertable into a first longitudinal cavity of one of said movable uprights and into a second longitudinal cavity of one of said movable crosspieces, wherein said one of said movable uprights and said one of said movable crosspieces are adjacent to each other.

9. The main tilting door according to claim 1, wherein said vertical sliding guides comprise discharge portions adapted to allow the insertion of said sliding supports in said vertical sliding guides.

10. The main tilting door according to claim 1, wherein each of said fixed uprights comprises at least one coupling portion which can be coupled to a respective coupling seat arranged on said fixed crosspiece.

11. The main tilting door according to claim 1, wherein said top of each of said fixed uprights comprises at least one pulley assembly provided with at least one pair of half-shells, made of plastic material, and with at least one pulley, pivotally associated with said pair of half-shells, and on which a rope, connected to a respective one of said movable uprights and to at least one counterweight, can be at least partially wound.

12. The main tilting door according to claim 11, further comprising: at least one electric motor unit assembled on said fixed crosspiece and adapted to set said pulleys in rotation.

* * * * *